(12) United States Patent  
Rim (10) Patent No.: US 7,997,992 B2  
(45) Date of Patent: Aug. 16, 2011

(54) GOLF BALL ALIGNING DEVICE

(76) Inventor: Chol Kwi Rim, Gardena, CA (US)

( * ) Notice: Subject to any disclaimer, the term of this patent is extended or adjusted under 35 U.S.C. 154(b) by 0 days.

(21) Appl. No.: 12/459,076

(22) Filed: Jun. 29, 2009

(65) Prior Publication Data

US 2010/0331095 A1   Dec. 30, 2010

(51) Int. Cl.
*A63B 69/36* (2006.01)

(52) U.S. Cl. .......................... 473/211; 473/210; 473/268

(58) Field of Classification Search .................. 473/207, 473/208, 210, 211, 266, 268, 274
See application file for complete search history.

(56) References Cited

U.S. PATENT DOCUMENTS

| | | | |
|---|---|---|---|
| 1,459,705 A | 6/1923 | Bullock | |
| 3,156,211 A | 11/1964 | Mallory, Jr. | |
| 3,178,187 A | 4/1965 | Cardwell | |
| 3,437,339 A | 4/1969 | Starck | |
| 3,812,593 A | 5/1974 | Wydro | |
| 4,696,111 A * | 9/1987 | Gardner | 33/262 |
| 4,896,375 A * | 1/1990 | Colucci | 2/12 |
| 5,171,152 A * | 12/1992 | McCleery | 473/210 |
| 5,208,916 A * | 5/1993 | Kelman | 2/10 |
| 5,413,346 A * | 5/1995 | Hedlund et al. | 473/210 |
| 5,715,030 A * | 2/1998 | Quaresima | 351/44 |
| 6,088,837 A * | 7/2000 | Baker | 2/195.1 |
| 6,721,962 B1 | 4/2004 | Plaire | |
| 6,804,831 B2 * | 10/2004 | Guerra | 2/209.11 |
| 6,817,711 B2 * | 11/2004 | Schubert | 351/155 |

* cited by examiner

*Primary Examiner* — Nini Legesse
(74) *Attorney, Agent, or Firm* — Albert O. Cota (57) ABSTRACT

A golf ball aligning device (GBAD) (10) that is disclosed as a golf visor (12) and as a golf cap (80). Both the visor (12) and the cap (80) feature a bill (40) that has a front square edge (44), an upper surface (50) and a lower surface (52). To the lower surface (52) and adjacent to the front square edge (44) of the bill (40) is applied a dark non-glare finish (60). Alternatively, to the square front edge (44) of the bill (40) can be attached by means of a living hinge (58) a square movable tab (48) also having a dark non-glare finish (60). The dark non-glare finish (60) when viewed by a golfer, aids in aligning a straight ball trajectory along a golf course. The GBAD (10) can also be designed to include a bill adjusting assembly (114) that interfaces with the right and left head bands (26), (32) and the respective right and left hand bands (26, 32).

6 Claims, 8 Drawing Sheets

GOLF BALL ALIGNING DEVICE

TECHNICAL FIELD

The invention generally pertains to golf head gear and more particularly to a golf ball aligning device (GBAD) that is attached to the bill of a golf visor or a golf cap. The GBAD aids a golfer in aligning a straight ball trajectory along a golf course.

BACKGROUND ART

One of the most popular sports throughout the world is golf. Especially in recent years, golf has become a sport that is watched and played by many different types of people, including children and adults. As a result of this popularity there has been an increased interest in, and the production of golf equipment and accessories. As golf has become more popular, sporting goods manufacturers have attempted to provide a wide variety of golf clubs, golf apparel such as shoes, golf bags and other items. Some companies have also tried to provide golfers with devices or accessories that will improve the golfer's ability. These items vary from those that improve the way a golfer swings a golf club to those that promise to improve the accuracy of a golf ball that is hit.

While certain items have proven to be useful and do in fact live up to their improvement goals, many items have not been effective. One of the most difficult elements of playing golf is the golfer's ability to accurately line up and sight a golf ball's trajectory before hitting the ball. The angle at which the ball is struck is important, and improvements such as golf clubs with specialized head angles have proven to be effective at addressing this aspect. Unfortunately, the strike angle is only part of the problem. A golfer must also be able to visually determine the trajectory that the ball will travel after it is struck. There have been attempts to utilize laser sighting devices to determine a golf ball's trajectory, but these devices are often complicated and expensive. Additionally, many golfer's feel a laser sighting device detracts from the game of golf by providing an unfair technological advantage.

If there was some way of providing a simple-to-use, accurate and non-obtrusive means of determining a golf ball's trajectory the benefits would be significant.

A search of the prior art did not disclose literature or patents that read directly on the claims of the instant invention. However, the following U.S. patents are considered related.

| PAT. NO. | INVENTOR | ISSUED |
|---|---|---|
| 6,721,962B1 | Plaire | 20 Apr. 2004 |
| 4,896,375 | Colucci | 30 Jan. 1990 |
| 3,812,593 | Wydro | 28 May 1974 |

The U.S. Pat. No. 6,721,962 patent discloses a lighted hat that provides illumination for the user while maintaining the appearance of a conventional cap visor. The lighted cap has a head-engaging portion, a brim attached to the front of the head-engaging portion and a headband that is connected to the lower inside rim of the head-engaging portion. A low profile light is incorporated into the brim of the hat where it is concealed within the brim.

The U.S. Pat. No. 4,896,375 patent discloses a golf cap having a headband and an elongated visor. The visor includes at least one marker which is plainly visible to the wearer. The visor is longer than the usual golf cap visor, and is sufficiently long so that the lower edge is below eye level when the wearer has positioned the hat on their head. The marker is in the form of a longitudinally extending line along the centerline of the visor. The golfer wearing the hat views the golf ball so that the longitudinal line is aligned with the ball and perpendicular to the proposed line of flight.

The U.S. Pat. No. 3,812,593 patent discloses a golfer's green reader made up of an elastic head band, a visor attached to the head band and a spirit level attached to the front of the visor. On the lower side thereof, the level is disposed adjacent the front of the visor so that the user can view the level and thereby estimate the topography of the terrain of a golf green.

For background purposes and as indicative of the art to which the invention relates, reference may be made to the following remaining patents found in the search:

| PAT. NO. | INVENTOR | ISSUED |
|---|---|---|
| 3,437,339 | Starck | 8 Apr. 1969 |
| 3,178,187 | Cardwell | 13 Apr. 1965 |
| 3,156,211 | Mallory, Jr. | 10 Nov. 1964 |
| 1,459,705 | Bullock | 19 Jun. 1923 |

DISCLOSURE OF THE INVENTION

The instant invention discloses a golf visor that, when worn by a golfer, aids in providing a straight trajectory along a golf course. The golf visor is comprised of a curved forehead section, an elongated right head band, an elongated left head band, and a bill. The curved forehead section has an upper edge and a lower edge, wherein the upper edge tapers downward and terminates at the right side and the left side. The elongated right head band has an outer edge and an inner edge, wherein the inner edge is integrally attached to the right side of the forehead section. The elongated left head band also has an outer edge and an inner edge, wherein the inner edge is integrally attached to the left side of the forehead section. Both the elongated right and left head bands are spring biased which causes the golf visor to be firmly held against a person's head.

The bill has a curved inner edge that is attached to the lower edge of the curved forehead section. The bill also has a left and a right curved section and the front square edge has outer corners that are preferably radiused. On the lower surface of the bill and adjacent to the front square edge is applied a dark non-glare finish.

The golf visor can also be made to include a square movable tab having an upper surface, a lower surface, an outer edge and an inner edge. The inner edge is movably attached to the front square edge of the bill by an attachment means, which preferably comprises a living hinge. The lower surface of the square movable tab has a dark non-glare finish, which is preferably a black finish. The black finish can be provided by a black non-glare paint or by black non-glare tape which is attached by an adhesive to the lower surface of the movable tab.

In view of the above disclosure, the primary object of the invention is to provide a golf visor that when the golf visor is worn by a golfer, the golf visor's bill can be positioned to provide a view of a straight trajectory along a golf course.

In addition to the primary object of the invention, it is also an object of the invention to provide a golf visor that:

can be made in various sizes for children or adults,
can be made in various colors, can include indicia such as advertising indicia or instructions for use,
can be worn as a regular sun-blocking visor,
is washable,
can significantly improve a golfer's score,
can be given away as a promotional item, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for a golf ball aligning device (GBAD), that is shown in FIGS. 1-10, and that is disclosed in two design configuration: a golf visor and a golf cap. The commonality between the two designs is that they both feature a bill having a front square edge. The square edged bill when viewed by a golfer, aids in aligning a straight ball trajectory along a golf course.

The first design disclosed for the GBAD 10 is the golf visor 12, which is shown in FIGS. 1-6. The golf visor 12 is comprised of the following major elements: a curved forehead section 14, an elongated right head band 26, an elongated left head band 32, a bill 40, a front square edge 44 and an alternate square movable tab 48.

Figure 1:
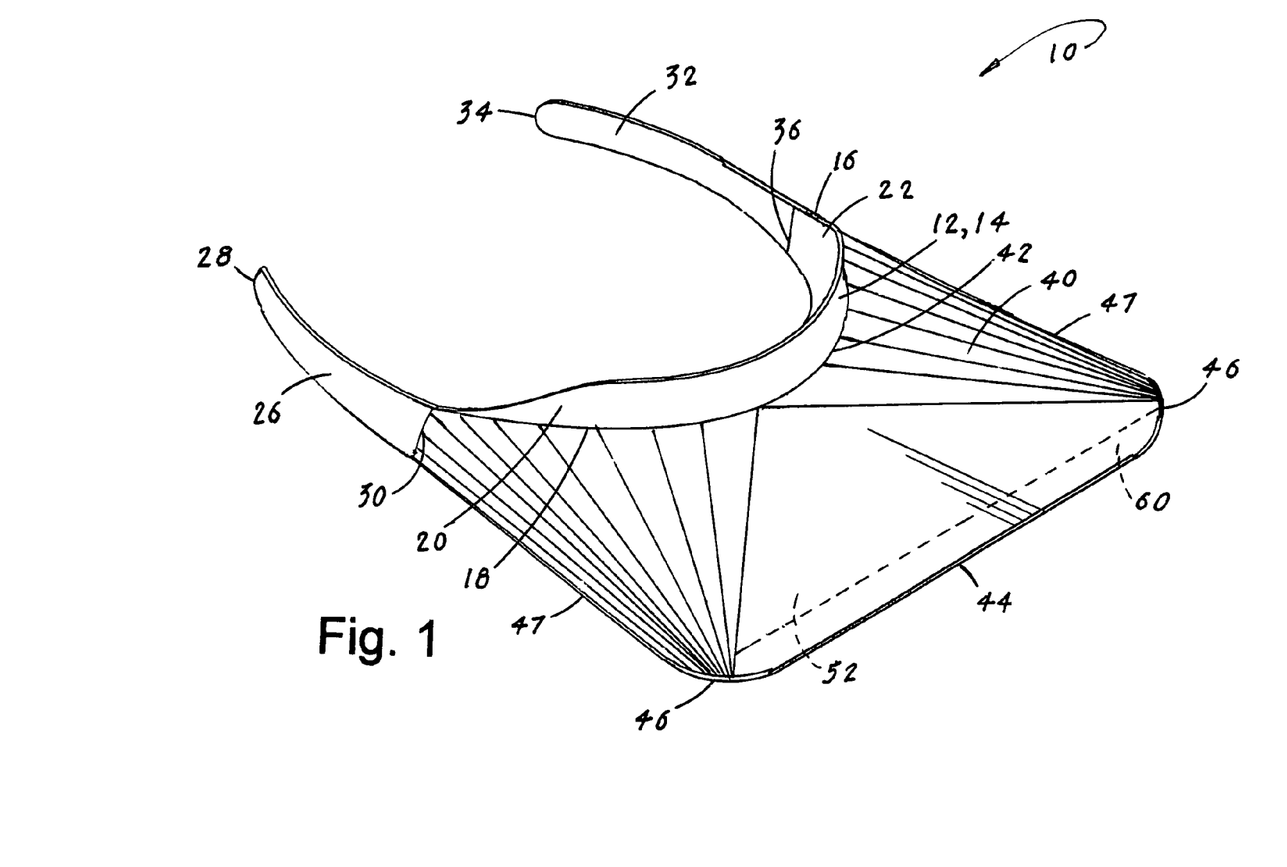
FIG. 1 is a perspective view of a golf ball aligning device configured as a golf visor having a curved bill with a front square edge having radiused corners.
Figure 2:
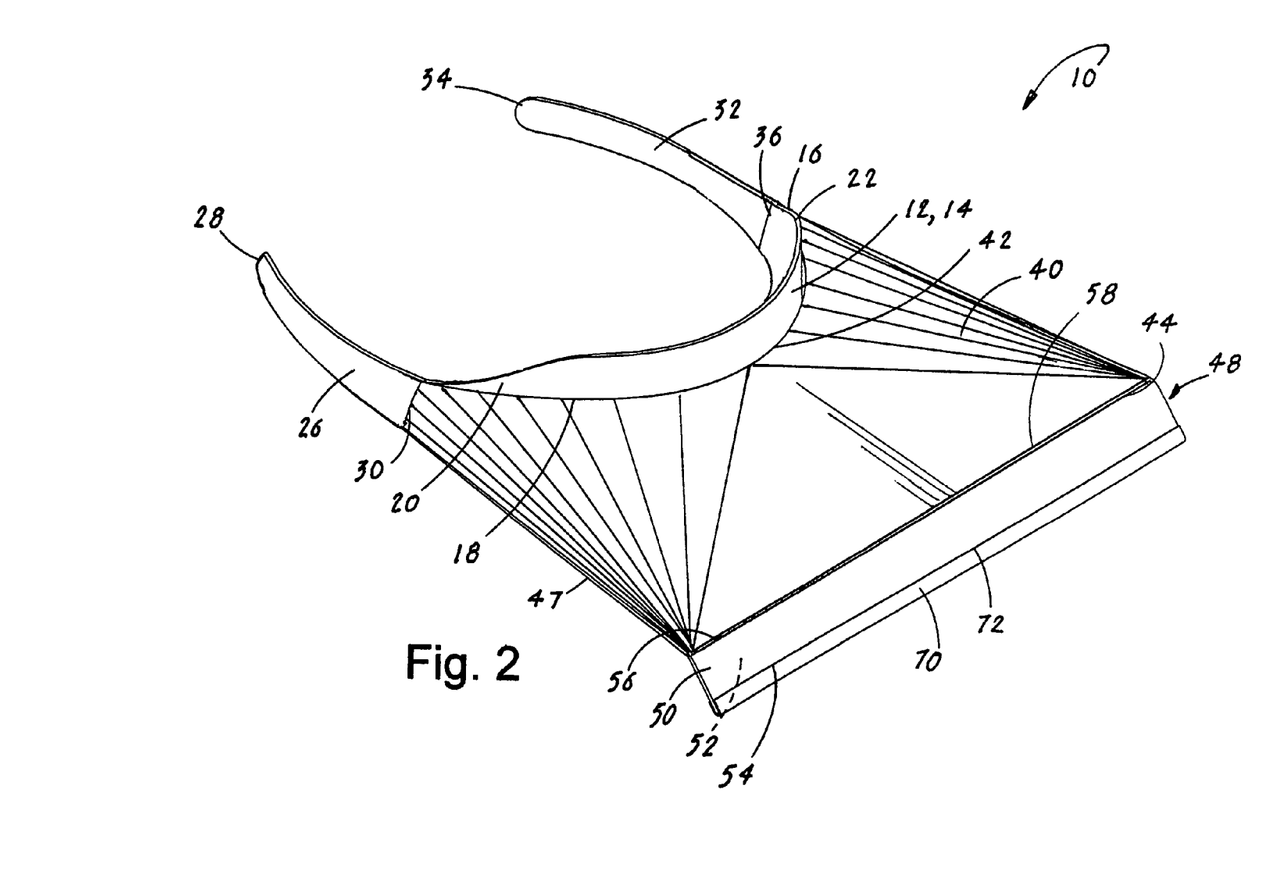
FIG. 2 is a perspective view of a golf visor having a curved bill with a square movable tab.
Figure 3:
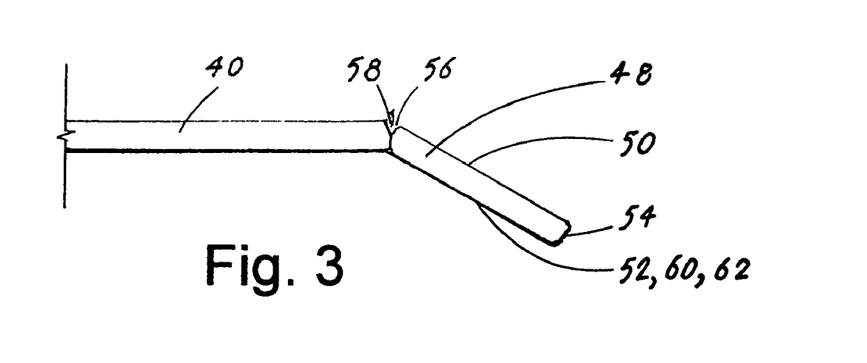
FIG. 3 is a partial side-elevational view of a tab having a lower non-glare finish.
Figure 4:
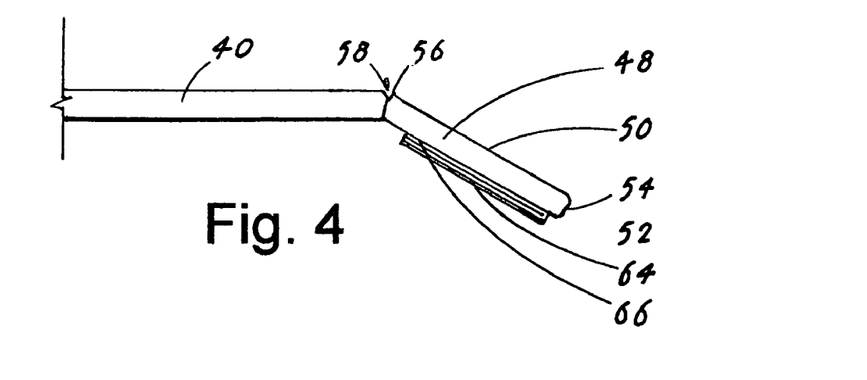
FIG. 4 is a partial side-elevational view of a tab having a lower surface to which is attached a non-glare black tape.

The curved forehead section 14, as shown best in FIGS. 1 and 2, has an upper edge 16 and a lower edge 18. The upper edge 16 tapers downward and terminates at a right side 20 and a left side 22. The elongated right head band 26 has an outer edge 28 and an inner edge 30. The inner edge is integrally attached to the right side 20 of the forehead 14. Likewise, the elongated left head band 32 has at outer edge 34 and an inner edge 36. The inner edge 36 is attached to the left side 22 of the forehead section 14. Both the right and left bands 26,32 are spring biased which allows the golf visor 12 to be firmly held against the head.

The bill 40, as also shown in FIG. 1, has a curved inner edge 42 and a front square edge 44 that preferably has radiused corners 46 and curved side sections 47. The curved inner edge 42 is attached to the lower edge 18 of the curved forehead section 14. The bill 40 can also be made to include a dark non-glare finish 60 that is applied to the bill's lower surface 52 and adjacent to the front square edge 44.

The golf visor 12, as shown in FIG. 2, can also be produced to include a square movable tab 48 having an upper surface 50, a lower surface 52, an outer edge 54 and an inner edge 56. The inner edge 56 is movably attached to the front square edge 44 of the bill 40 by an attachment means that preferably consists of a living hinge 58. To avoid glare, the lower surface 52 of the tab 48 has a dark non-glare finish, that preferably is comprised of a black non-glare finish 60. The black non-glare finish 60 can be provided by a black non-glare paint 62. Alternatively, the black non-glare finish 60 can be provided by a black non-glare tape 64 that is attached by an adhesive 66 to the lower surface 52 of the movable tab 48.

Figure 5:
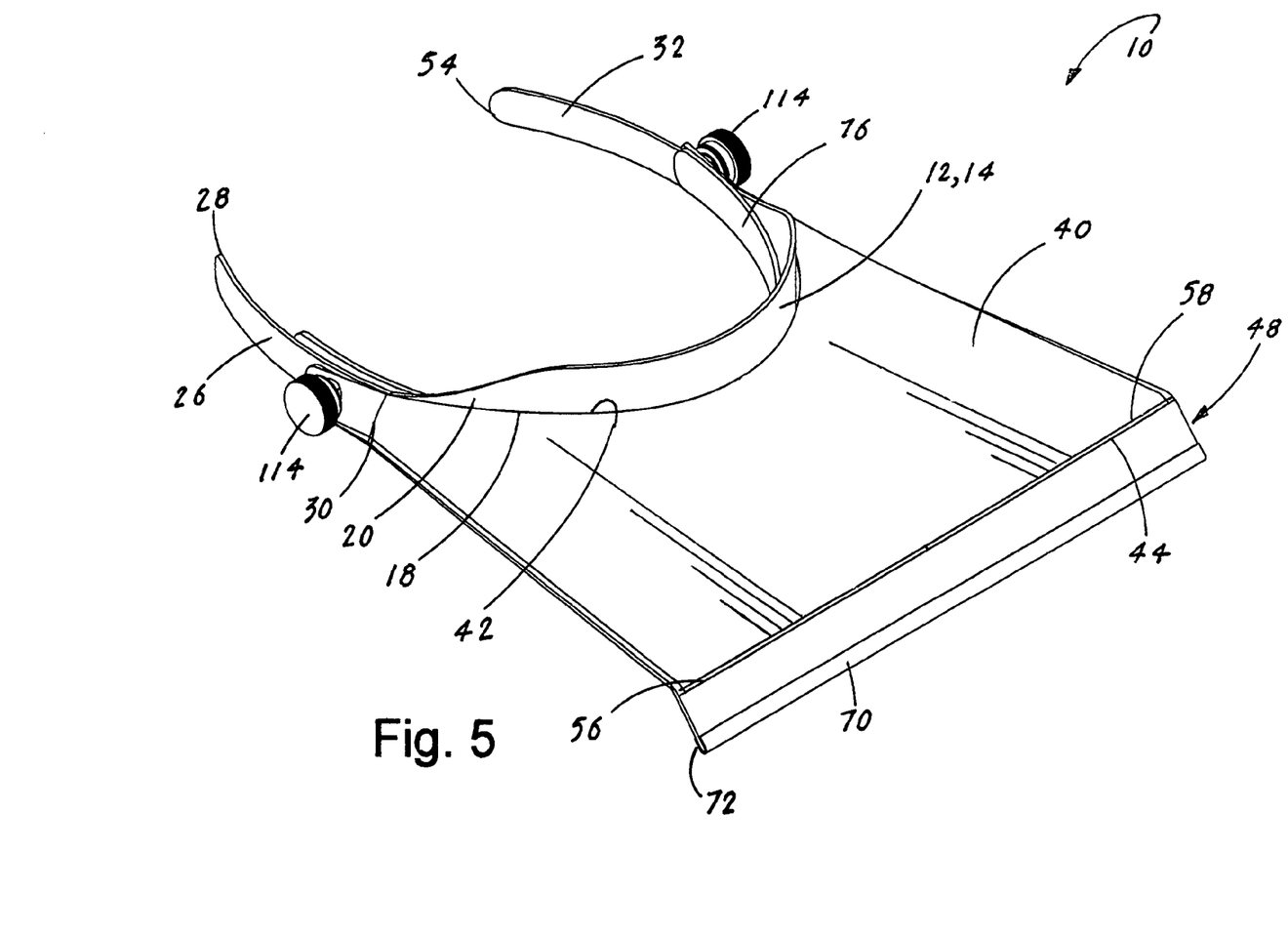
FIG. 5 is a perspective view of a golf visor having a square bill that is rotatably attached to the visor by means of a bill adjusting assembly.
Figure 6:
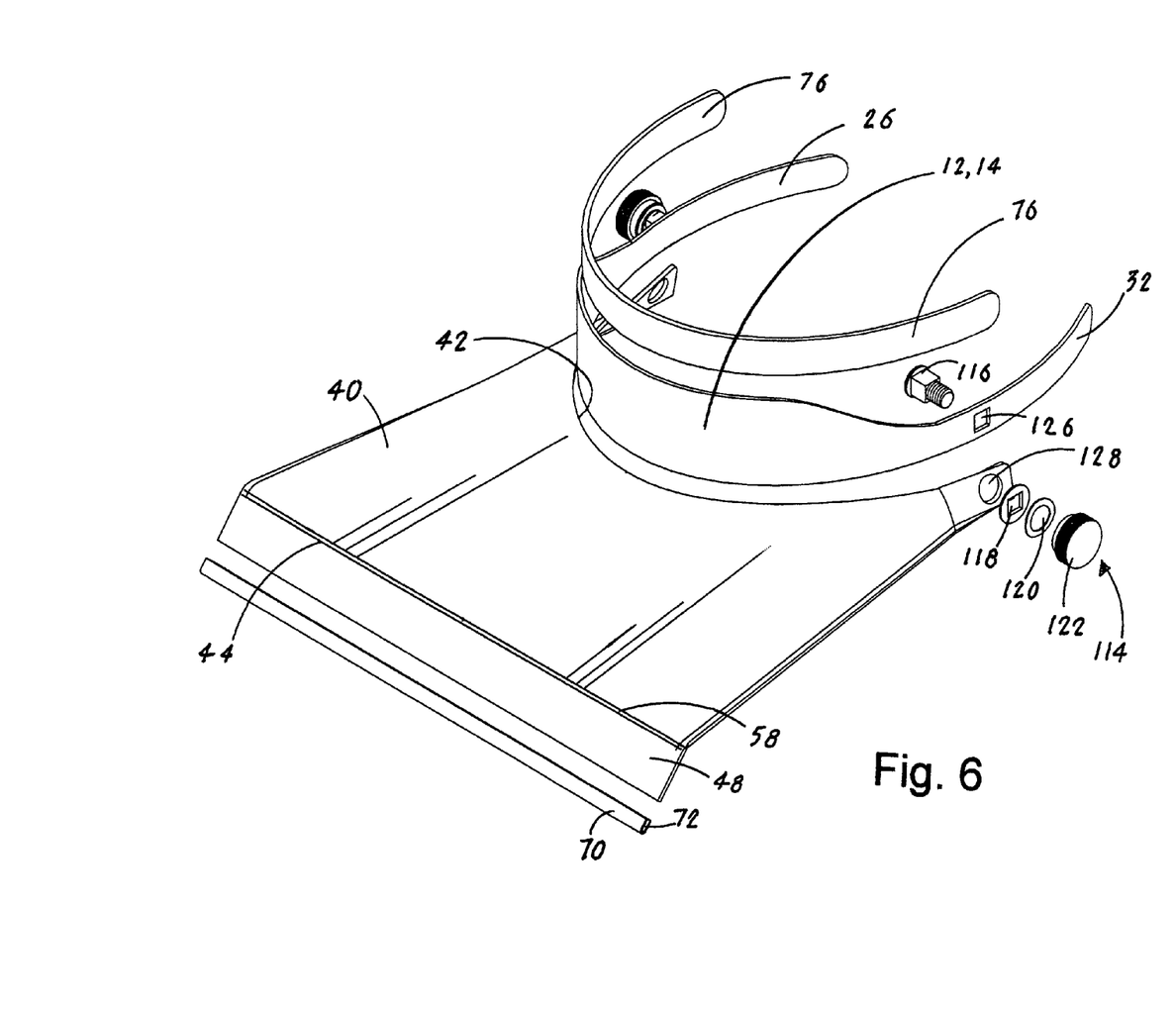
FIG. 6 is a perspective exploded view of the golf visor and square bill shown in FIG. 5.

To further aid in maintaining the bill 40 and the square movable tab 48 in a square configuration a removably attached rigid tube 70 can be utilized. The tube 70, as shown in FIGS. 2, 5 and 6, has a split edge 72 that is dimensioned to allow the tube 70 to be inserted and retained over the outer edge 54 of the square movable tab 48.

Figure 8:
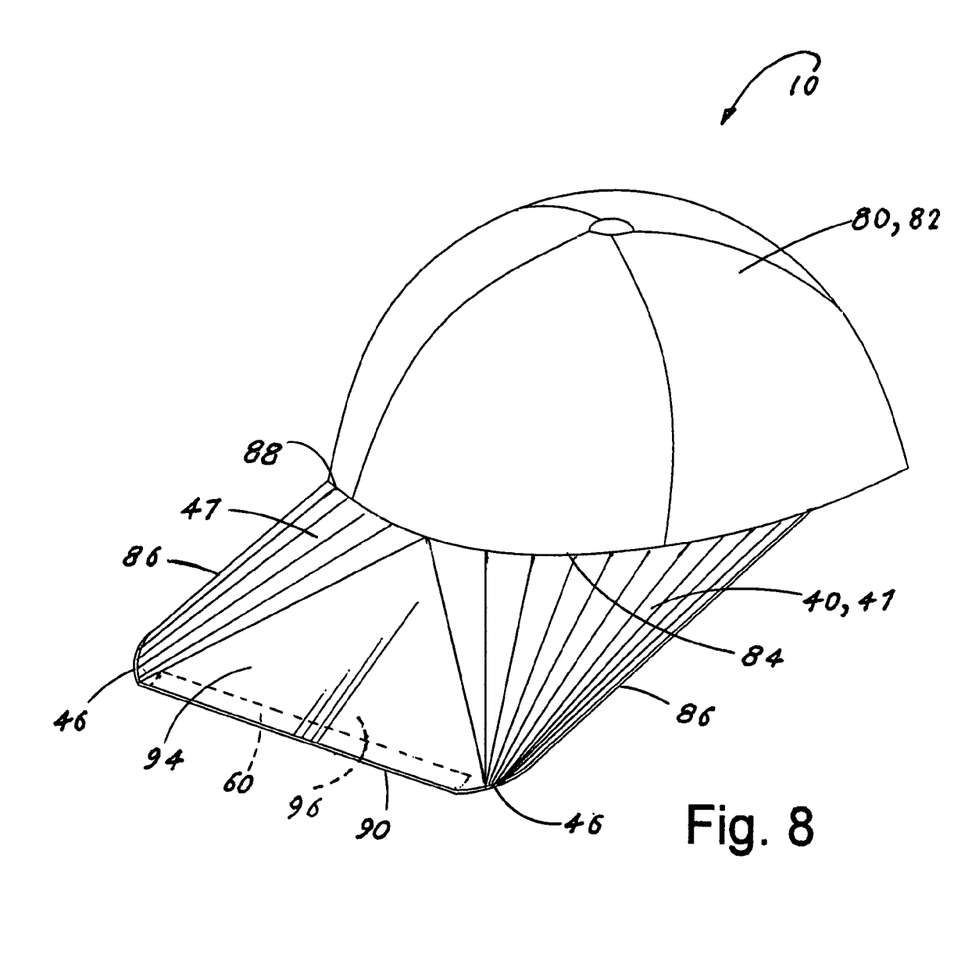
FIG. 8 is a perspective view of a golf ball aligning device configured as a golf cap having a bill with a front square edge that has radiused corners.
Figure 9:
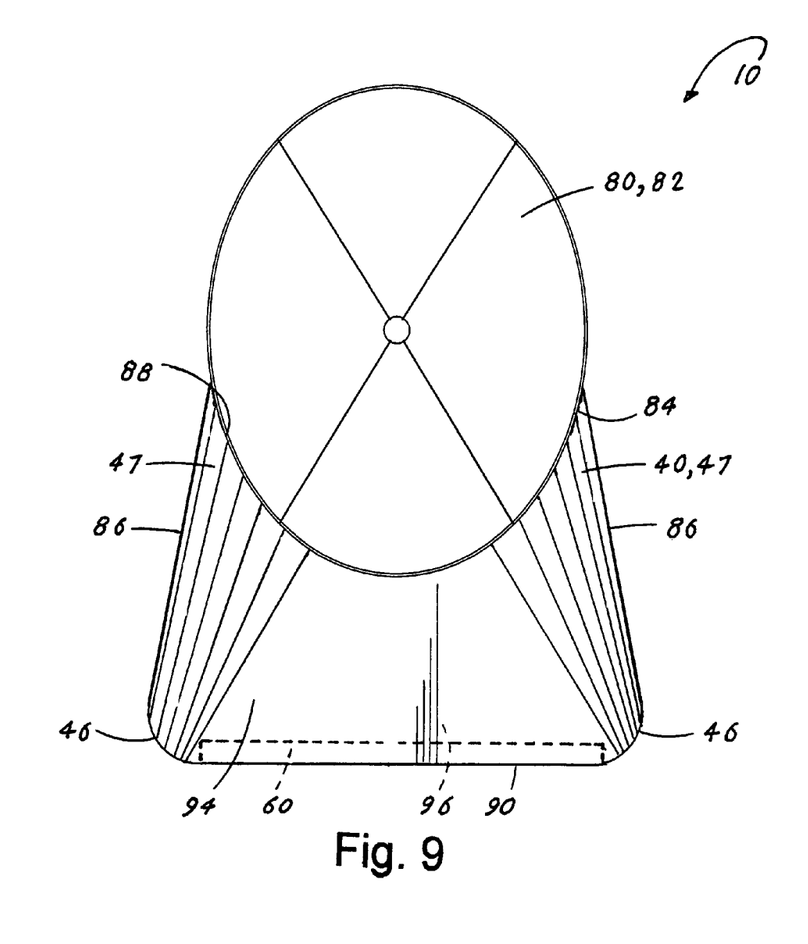
FIG. 9 is a top plan view of the golf cap shown in FIG. 8.
Figure 10:
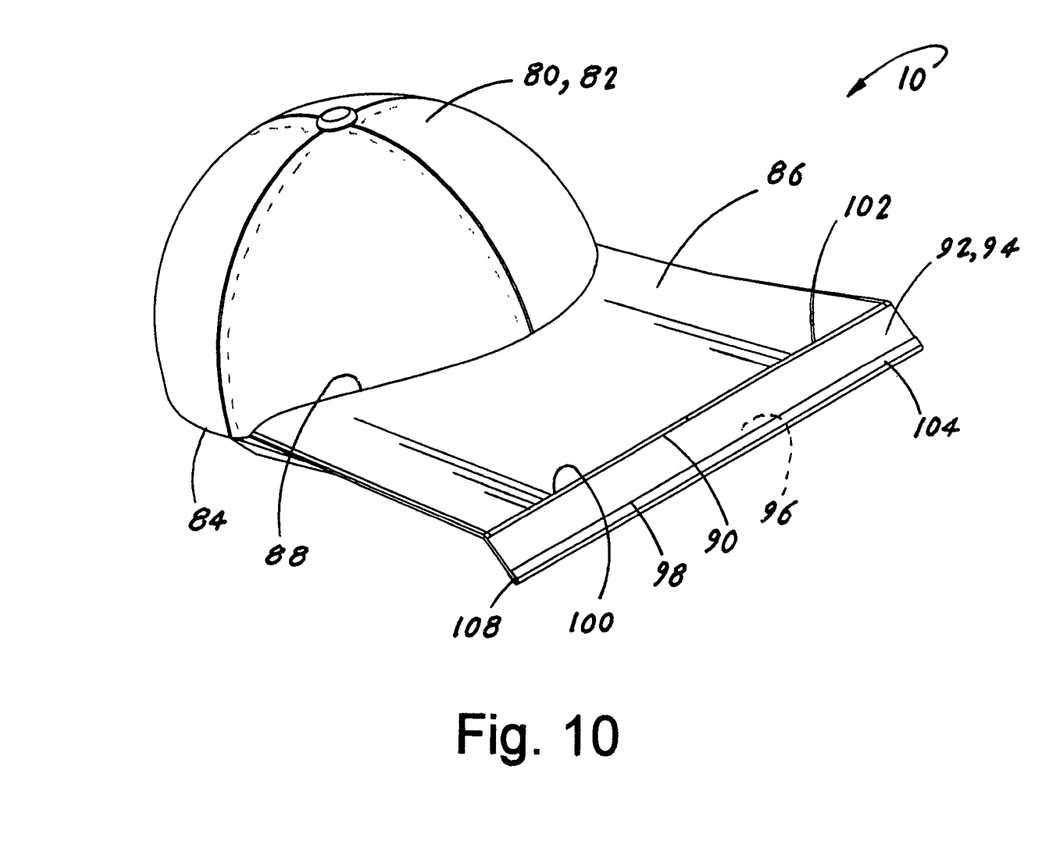
FIG. 10 is a perspective view of a golf cap having a bill with a front square edge to which is attached a square movable tab.

The second design disclosed for the GBAD 10 is the golf cap 80, which is shown in FIGS. 8, 9 and 10. The golf cap is comprised of the following major elements: a head enclosure 82, a bill 86, a square movable tab 92 and a rigid tube 106.

The head enclosure 82 has a circular lower edge 84. The bill 86 has a curved inner edge 88 that is attached to the circular lower edge 84 of the head enclosure 82. The bill 86 also has a front square edge 90 that when viewed by a golfer, the straight edge aids in aligning a straight ball trajectory along the golf course. The bill 86, as shown in FIGS. 8 an 9, can also be made to include a dark non-glare finish 60 that is applied to the lower surface 96 of the bill 86 and adjacent to the front square edge 90 of the bill 86.

The golf cap 80 can also be made to include a square movable tab 92, as shown in FIG. 10, that has an upper surface 94, a lower surface 96, an outer edge 98 and an inner edge 100. The inner edge 100 is movably attached to the front square edge 90 of the bill 86 by an attachment means that preferably consist of a living hinge 102. The square movable tab 92 preferably has a lower surface 96 that has a dark non-glare finish.

To maintain the bill 86 and the square movable tab 92 in a square configuration, a removably attached rigid tube 104 can be utilized. The tube 104, as also shown in FIGS. 8 and 10, has a split edge 108 that is dimensioned to allow the tube 104 to be inserted and retained over the outer edge 98 of the square movable tab 92.

Figure 7:
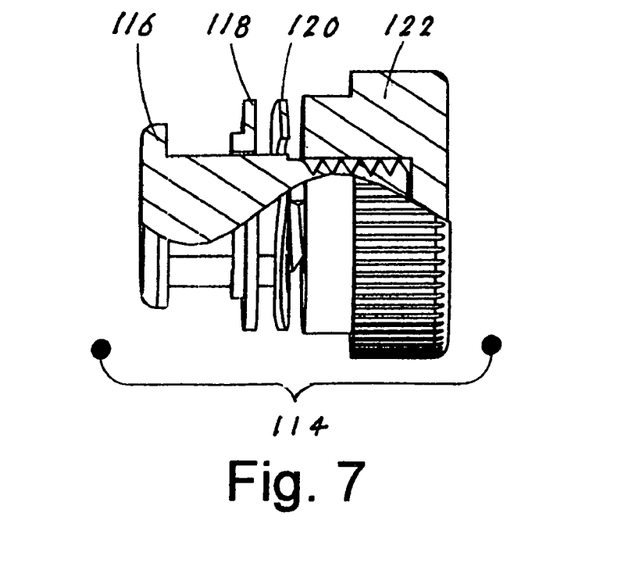
FIG. 7 is a partial cross-sectional side elevational view of the bill adjusting assembly.

The golf visor 12 can also be designed to function with a bill adjusting assembly (BAA) 114, as shown in FIGS. 5, 6 and 7. The BAA 114 is comprised of the following elements: a square-head threaded bolt 116, a keyed washer 118, a concave washer 120 and a threaded adjusting knob 122.

To utilize the BAA 114, the elongated right head band 26, has a square keyed slot 126 located between the outer edge 28,30, the inner edge 30,36. Likewise the bill 40 has adjacent the respective inner edge terminus 44, a round base 128 that is in alignment with the respective square head threaded bolt 116.

The bill 40 is movably attached to the curved forehead section 14 by the bill adjusting assembly 114 that is attached, as shown best in FIG. 6 by:

(1) inserting the square-head threaded bolt 116 into the square bore 126 and into the round bore 128, (2) inserting the keyed washer 118 into the protrusion bore, (3) inserting a concave washer into the threaded section of the bolt 116, and (4) attaching the threaded adjustment knob 122 into the end of the threaded bolt 116. The bill adjusting assembly allows the bill to be rotated upward and downward to allow a golfer to place the bill 40 into a position that when viewed by a golfer it aids the golfer to provide a straight ball trajectory along a golf course.

To further enhance the utility of the GBAD a sweat band 76 can be removably attached, as shown best in FIG. 6, between a person's forehead and the curved forehead section 14.

While the invention has been described in detail and pictorially shown in the accompanying drawings it is not to be limited to such details, since many changes and modifications may be made to the invention without departing from the spirit and the scope thereof Hence, it is described to cover any and all modifications and forms which may come within the language and scope of the claims.

The invention claimed is:

1. A golf ball aligning device configured as a golf visor comprising:
   a) a curved forehead section having an upper edge and a lower edge, wherein the upper edge tapers downward and terminates at the right side and left side,
   b) an elongated right head band having an outer edge and an inner edge, wherein the inner edge is integrally attached to the right side of said forehead section,
   c) an elongated left head band having an outer edge and an edge, wherein the inner edge is integrally attached to the left side of said forehead section,
   d) a bill having a curved inner edge that is attached to the lower edge of said curved forehead section, a left and a right curved section and a front square edge,
   e) a dark non-glare finish that is applied to the lower surface and adjacent to the front square edge on said bill,
   f) a square movable tab having an upper surface, a lower surface having a dark non-glare finish, an outer edge and an inner edge, wherein the inner edge is movably attached to the front square edge of said bill by an attachment means, and
   g) a removably-attached rigid tube having a split edge that allows the tube to be inserted and retained over the outer edge of said square movable tab, wherein said tube aids in maintaining said bill and said square movable tab in a straight configuration to aid a golfer in aligning a straight ball trajectory along a golf course.

2. A golf ball aligning device configured as a golf visor comprising:
   a) a curved forehead section having an upper edge and a lower edge, wherein the upper edge tapers downward and terminates at the right side and left side,
   b) an elongated right head band having an outer edge and an inner edge, wherein the inner edge is integrally attached to the right side of said forehead section, wherein the right hand band further having a square bore,
   c) an elongated left head band having an outer edge and an inner edge, wherein the inner edge is integrally attached to the left side of said forehead section, wherein the left hand band further having a square bore,
   d) a bill having an upper surface, a lower surface, a curved inner edge that conforms to the curved forehead section, and a front square edge, wherein said bill terminates at a right edge and a left edge, wherein adjacent the right and left edges is a round bore that is in alignment with the respective square bore on said forehead section, wherein said bill is removably attached to said curved forehead section by the bill adjusting assembly that is attached by:
      (1) inserting a square head threaded bolt into the square bore and into the round bore,
      (2) inserting a keyed washer into the protrusion bore,
      (3) inserting a concave washer into the protrusion bolt, and
      (4) attaching a threaded knob into the end of the threaded bolt wherein said bill adjusting assembly allows the bill to be rotated upward and downward to allow a golfer to place the bill into a position that when viewed by a golfer it aids a golfer by providing a straight path along a golf course.

3. The device as specified in claim 2 wherein the lower surface of said bill has a black non-glare surface.

4. The device as specified in claim 3 further comprising a removably attached clear plastic tube having a split edge that allows the tube to be inserted and retained over the front square edge of said bill.

5. The device as specified in claim 2 further comprising a sweat band that is removably attached between a person's forehead and the curved forehead section.

6. A golf ball aligning device configured as a golf cap comprising:
   a) a head enclosure having a circular lower edge,
   b) a bill having a curved inner edge that is attached to the circular lower edge of said head enclosure, a left and a right curved section and a front square edge,
   c) a dark non-glare finish that is applied to the lower surface and adjacent to the front square edge of said bill,
   d) a square movable tab having an upper surface, a lower surface having a dark non-glare finish, an outer edge and an inner edge, wherein the inner edge is movably attached to the front square edge of said bill by a living hinge, and
   e) a removably attached rigid tube having a split edge that allows the tube to be inserted and retained over the outer edge of said square movable tab, wherein the front square edge when viewed by a golfer, aids in aligning a straight trajectory along the golf course.

* * * * *